Nov. 28, 1933.  W. S. CALVERT  1,937,034
MEANS FOR REGENERATING ZEOLITES
Filed Jan. 23, 1928
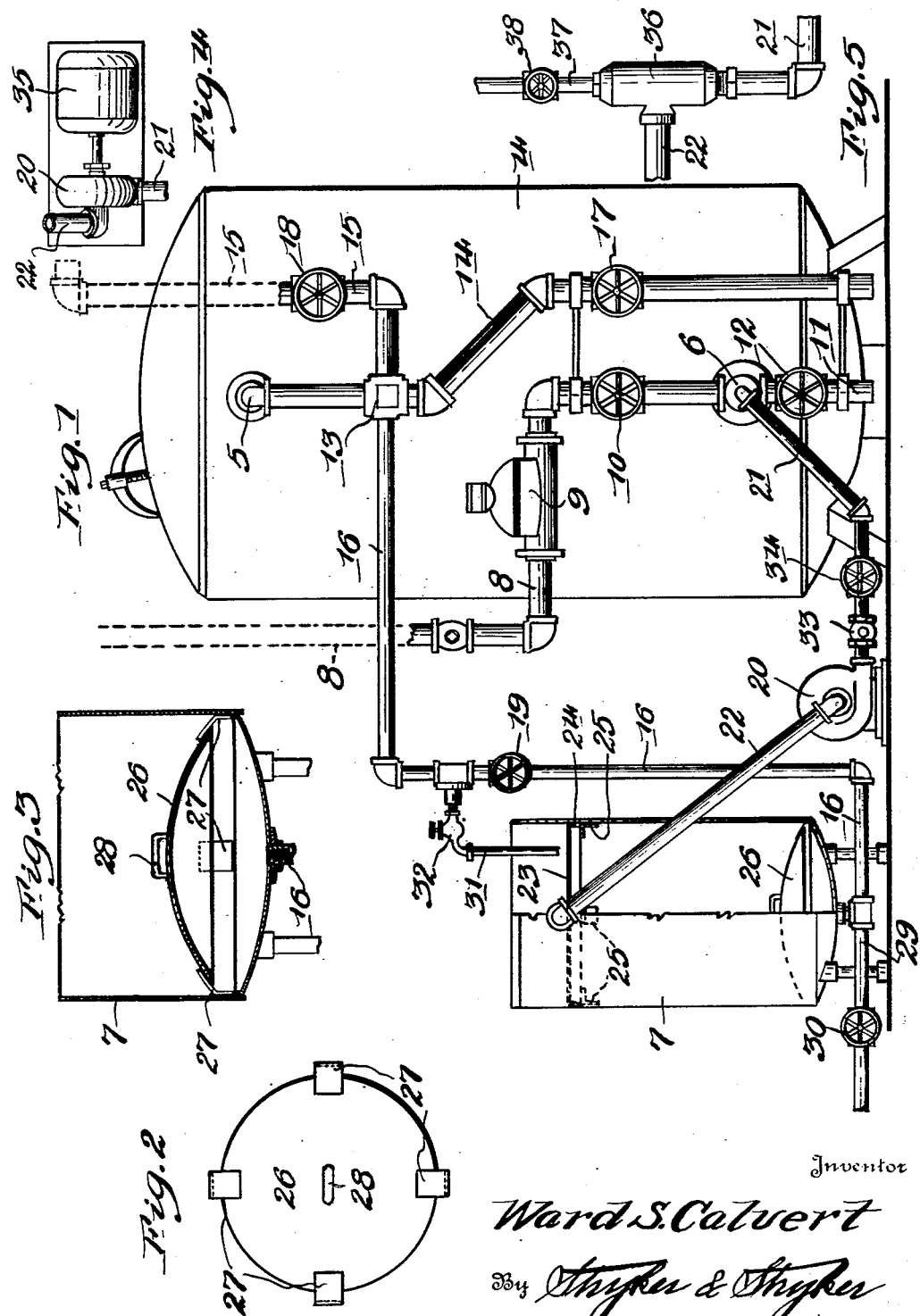
Inventor
Ward S. Calvert
By Stryker & Stryker
Attorneys Patented Nov. 28, 1933

1,937,034

UNITED STATES PATENT OFFICE 1,937,034

MEANS FOR REGENERATING ZEOLITES

Ward S. Calvert, Omaha, Nebr., assignor to The Refinite Company, Omaha, Nebr., a corporation of Delaware Application January 23, 1928. Serial No. 248,710

6 Claims. (Cl. 210—24)

This invention relates to water softeners in which a bed of granular, zeolitic mineral is employed and particularly to improvements in the apparatus and method described in my copending application for patent, Serial No. 582,648, filed August 18, 1922, whereby the mineral bed is regenerated or revivified after use.

It is my object to improve water softeners of the zeolitic or base exchange type by securing thorough regeneration of the mineral bed, reducing both the time required for regeneration and quantity of water required for washing and regeneration and securing increased softening capacity in a given period of time.

Other objects are to reduce the space occupied by the apparatus, to adapt it for use where the available space is limited as to arrangement as well as size and to utilize a maximum of the regenerating value of the salt used for that purpose. The invention also includes certain other novel features of construction which will be more fully pointed out in the following specification and claims.

Referring to the accompanying drawing which illustrates one form of apparatus for carrying out my invention, Figure 1 is an elevation showing my improved softening apparatus with the salt container partially in central vertical section; Fig. 2 is a horizontal section through the salt container, showing the baffle in the bottom of the same; Fig. 3 is a fragmentary central vertical section through the base of the salt container and on a somewhat enlarged scale; Fig. 4 is a plan view of the circulating pump and motor for operating the same and Fig. 5 illustrates a steam ejector arranged to forcibly circulate the brine in place of the motor and pump of Fig. 4.

As illustrated, I provide a large tank 4 containing a bed of granular zeolites through which the water to be softened may be passed. This container is a pressure tank having an opening above the mineral bed into which a pipe 5 extends and an opening beneath the bed which communicates with a pipe 6. A relatively small, open salt container 7 is placed near the large container 4 to receive a charge of granular salt for regeneration. This salt container need not be placed upon a level with the zeolite container but may be located above or below the large tank as desired or wherever the required small space is available. Economy in the space occupied by the apparatus is promoted by this invention because the container 7 may be made about 2 feet in diameter and will supply sufficient salt for regenerating a zeolite bed filling a container as large as 8 feet in diameter. A salt container 2 feet in diameter and 3½ feet in length has been found to be ample to supply the salt needed in the regeneration of mineral beds containing 13,000 pounds of natural zeolite prepared from certain clays found in South Dakota.

Obviously the arrangement of the pipes and valves for controlling the admission of liquid to the zeolite bed and for withdrawing softened water or wash water therefrom may be varied between wide limits. In the embodiment illustrated, hard water is admitted through a supply pipe 8 and passes through a meter 9 to a pipe 6 communicating with the container 4 beneath the mineral bed therein. A valve 10 is provided to control the admission of water to the bed. Water may be drained from the bottom of the container 4 through a branch 11 of the pipe 6 which branch is controlled by a valve 12. The pipe 5 is provided with a T coupling 13 communicating with the drain pipe 14, a soft water outlet pipe 15 and a brine return pipe 16. This brine pipe 16 opens into the bottom of the salt container 7. Valves 17 and 18 control the flow of water through the pipes 14 and 15 respectively, and a valve 19 is provided in the brine pipe 16.

Brine formed in the salt tank 7, as hereinafter described, may be continuously circulated through the bed of zeolites in the container 4 by means of a power driven pump 20. This pump has connections with a delivery pipe 21 and an intake pipe 22, the former communicating with the pipe 6 and the latter opening at its intake end into the top of the container 7 above a strainer 23. This strainer is removable from the open top of the container 7 and preferably consists of a wire screen, 14 to 20 mesh, secured to a frame ring 24 and supported upon brackets 25 near the top of the container 7. Disposed in the bottom of the container 7 is a removable baffle 26 having its outer periphery spaced from the side walls of the container 7 as shown in Fig. 2. Suitable legs 27 extend outward and downward from the periphery of the baffle 26 to retain the same in spaced relation to the walls and bottom of the container 7. The lower ends of the legs 27 rest upon the bottom of the container 7 and a handle 28 is provided to facilitate removal of the baffle.

The opening through the branch 29 of the pipe 16 is controlled by a valve 30. The branch 29 with the valve is provided to dispose of sediment which is deposited in the salt container 7 during the regenerating operation as hereinafter described. To facilitate washing such sediment out through the branch pipe 29 a flexible hose 31 is arranged to extend into the top of the container 7 and to be supplied with water from the pipe 16. Flow from the hose 31 is under control of a valve 32 disposed in a branch pipe of the pipe 16. Between the pump 20 and pipe 6 is a check valve 33 and a manually operable valve 34, the check valve being arranged to allow flow from the pump into the bottom of the container 4 but preventing backflow through the pipe 21. As shown in Fig. 4 the pump 20 is arranged to be driven by an electric motor 35. In Fig. 5 I have illustrated a steam ejector 36 adapted to be connected with the pipes 21 and 22 in place of the centrifugal pump 20. The pipe 22 is connected to the intake opening of the ejector and the pipe 21 communicates with the delivery end thereof. Steam under pressure is supplied to the device through a pipe 37 having a control valve 38. When the valve 38 is opened steam is admitted to the ejector 36 to draw liquid from the pipe 22 and to deliver it through the pipe 21 into the zeolite container 4.

Operation

In operation, assuming all of the valves to be closed, to soften water the valves 10 and 18 are opened. This causes water under pressure from the pipe 8 to enter the bottom of the container 4 and to pass upward through the mineral bed where it is softened. The soft water passes out through the pipe 5, T coupling 13 and pipe 15. To prepare for regeneration of the zeolite bed, a predetermined quantity of granular salt is placed in the container 7 after removing the strainer 23. The salt is supported upon the baffle 26. The screen 23 is now replaced and the small container 7 filled with water, to a level above the upper end of the pipe 22, by opening the valve 32. When the container 7 has been filled with water the valve 32 is closed. The water in the container 7 forms a concentrated brine and seals the intake end of the pipe 22 so that the brine may be withdrawn through said pipe when required. When it is desired to regenerate, assuming that the container 4 is filled with water and that all of the manually operable valves are closed, the valves 19 and 34 are opened and the motor 35 (or steam ejector 36) is started. The pump 20 or ejector now withdraws brine from the container 7 above the strainer 23 and forces the same through the pipe 21 into the container 4, then upwardly through the bed of zeolitic mineral and out of the top of said container, through the pipes 5 and 16 into the bottom of the container 7 beneath the baffle 26. This baffle directs the inflowing water or brine laterally and then through the remaining salt in the container 7 which salt is rapidly dissolved to form brine of increasing strength. The brine rises through the strainer 23 and is recirculated as above described through the mineral bed until regeneration is complete. I prefer to maintain the flow of brine by operating the pump 20 or ejector 36 throughout the regenerating period.

During regeneration the brine first forced through the zeolite bed has such a high specific gravity and is delivered at such a velocity that it loosens any part of the bed which may have become packed so that contact between the brine and particles of mineral is increased to a marked degree. Impurities or sediment such as lint, shale or other foreign substances which are often present in the salt are retained in the container 7 where most of them settle to the bottom. It will be evident that upon entering the container 7 the velocity of the brine is reduced so that the greater part of the impurities remain near the bottom and do not reach the strainer 23. The finer and lighter particles, which would otherwise pass out through the pipe 22, are retained in the container 7 by the strainer 23. With this arrangement of the strainer it has been found that difficulties caused by clogging of the screen are eliminated and at the same time the foreign matter is excluded from the zeolite bed.

When regeneration is complete the motor 35 or ejector 36 is stopped and the brine is washed out of the bed by opening the valves 10 and 17. The flow of wash water through the mineral bed and from the pipe 8 out the waste pipe 14 is allowed to continue until the bed has been washed to the desired extent when the valve 17 is closed and the valve 18 opened to again place the softener in normal operating condition. Solid matter or sediment remaining in the container 7 may now be washed out by opening the valves 19, 30 and 32, the hose 31 being used to wash the interior of said container as the solid particles are flushed out of the pipe 16 into the pipe 29 leading to the sewer or other place of disposal.

I have found that a granular bed of zeolite formed from certain clays mined in the Black Hills of South Dakota may be completely regenerated after use in the apparatus described above within a period of from thirty minutes to one hour, depending upon the degree of exhaustion of the zeolites. With the old methods the same bed of zeolites would require from five to ten hours for thoroughly regenerating. It thus follows that with my improvements a much larger amount of water may be softened in any given period of time than with the old method because the bed is put back into service within an hour after its exhaustion while formerly the bed was out of service for a much greater period of time.

Another important advantage of the present invention is the thoroughness with which the regeneration is accomplished. When the regeneration starts the first brine introduced into the bottom of the container is a relatively concentrated solution. This solution by reason of its high specific gravity has a tendency to redistribute the mineral particles if they have been packed or channeled. Thus all of the mineral particles are caused to come in contact with the brine and are regenerated and cleansed to an increased degree. With old methods of regeneration wherein the brine was introduced by gravity or siphon the velocity of the brine was relatively low and less agitation of the bed resulted. Furthermore, by maintaining the brine in continuous flow throughout the regenerating operation I find that its vitality or usefulness to regenerate the softening mineral may be substantially exhausted, whereas with old methods of regeneration, wherein the salt is allowed to stand in contact with the bed, it is impractical to completely exhaust the salt. Attempts have been made heretofore to reclaim the unspent salt but this results in returning impurities to the bed when the brine is again used. The present invention makes it unnecessary to reclaim the brine once used and at the same time makes it possible to obtain a maximum value from the salt in a greatly reduced period of time.

My invention is further economical in the use of water by reason of the fact that I employ a small salt tank and dissolve the salt by the use of water which is in the zeolite container at the commencement of the regenerating operation.

It is thus unnecessary to waste a large tank full of water before starting the regeneration operation. This is of great importance with the larger installations. Further a large saving in the quantity of water used in the operation of the device results from the fact that with my improved regenerating means and method it is not necessary to backwash the mineral bed after use.

Having described my invention what I claim as new and desire to protect by Letters Patent is:

1. In apparatus of the class described, a zeolite container having a bed of water softening mineral therein through which water to be softened may be passed, a second container, connections for passing brine from said second container through said bed and for returning the same to said second container in an endless circuit and power means arranged to force brine in an endless circuit through said connections, bed and second container, said connections including a pipe arranged to return brine from said zeolite container to the bottom of said second container and means for withdrawing brine from the top of said second container and for delivering the same to the zeolite container.

2. The apparatus specified in claim 1 in which a baffle is disposed near the bottom of the second container in spaced relation to the bottom and sides thereof for supporting a charge of granular salt and the pipe arranged to return brine from the zeolite container makes connection with said second container beneath said baffle.

3. In apparatus of the class described, a container for a bed of zeolitic softening material through which water to be softened may be passed, a container of relatively small size adapted to receive a charge of granular salt for the formation of brine, connections for passing liquid from said zeolite container through salt in said small container and for returning the same through the bed in said zeolite container in an endless circuit, and power means arranged to force liquid in an endless circuit through said connections, bed and small container, said connections including a pipe arranged to return liquid from said zeolite container to the bottom of said small container and means for withdrawing liquid from the top of said small container and for delivering the same to the zeolite container, brine for regeneration being formed by upward passage of water through granular salt in said small container during the circulation of water in said circuit.

4. In apparatus of the class described, a container for a bed of zeolitic softening material through which water to be softened may be passed, a container of relatively small size adapted to receive a charge of granular salt for the formation of brine, connections for passing liquid from said small container through said bed and for returning the same to said small container in an endless circuit, power driven means arranged to force liquid in an endless circuit through said connections, bed and salt container, said connections including a pipe arranged to return liquid from said zeolite container to the bottom of said salt container and means for withdrawing liquid from the top of said salt container and for delivering the same to the zeolite container, brine for regeneration being formed by upward passage of water through granular salt in said small container during the circulation of water in said circuit and means for retaining solid matter in said small container during the passage of liquid therethrough.

5. The apparatus specified in claim 1 in which a strainer is mounted in said second container, the pipe for withdrawing brine from the top of said second container communicates therewith at a point above said strainer, a baffle is disposed near the bottom of said second container in spaced relation to the same for supporting a charge of granular salt and the pipe arranged to return brine from the zeolite container makes connection with said second container beneath said baffle.

6. The apparatus specified in claim 1 in which means for removing solid matter from liquids passed through said second container and for retaining such solid matter in said second container are associated with said means for withdrawing brine from the second container.

WARD S. CALVERT.